(12) United States Patent
Oyama

(10) Patent No.: US 7,538,308 B2
(45) Date of Patent: May 26, 2009

(54) IMAGE PROCESSING APPARATUS AND CONTROL METHOD THEREOF

(75) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 11/332,379

(22) Filed: Jan. 17, 2006

(65) Prior Publication Data

US 2006/0163450 A1    Jul. 27, 2006

(30) Foreign Application Priority Data

Jan. 26, 2005    (JP)    ............................. 2005-018253

(51) Int. Cl.
*H01L 27/00*    (2006.01)
*G02B 7/04*    (2006.01)
*H04N 3/14*    (2006.01)
*G03B 17/48*    (2006.01)

(52) U.S. Cl. ................. 250/208.1; 250/201.2; 348/312; 396/429

(58) Field of Classification Search .............. 250/208.1, 250/201.2, 216, 221, 226; 348/222.1, 345, 348/360, 231, 220, 333, 246, 249, 272, 296, 348/312; 382/162, 164; 396/303, 304, 307, 396/374, 429

See application file for complete search history.

(56) References Cited

U.S. PATENT DOCUMENTS

2002/0054229 A1*  5/2002  Sasaki ........................ 348/312
2004/0196399 A1* 10/2004  Stavely ................... 348/333.01
2004/0227836 A1  11/2004  Tanaka
2005/0083424 A1*  4/2005  Tsukagoshi et al. ..... 348/333.01
2005/0094018 A1   5/2005  Oyama
2005/0128584 A1*  6/2005  Shulman et al. ............. 359/462
2006/0139669 A1   6/2006  Takahashi

FOREIGN PATENT DOCUMENTS

| JP | 6-3607 | 1/1994 |
| JP | 2004-80100 | 3/2004 |
| KR | 1997-0048879 | 7/1997 |
| KR | 2006-0074885 | 7/2006 |

* cited by examiner

*Primary Examiner*—Georgia Y Epps
*Assistant Examiner*—Don Williams
(74) *Attorney, Agent, or Firm*—Fitzpatrick, Cella, Harper & Scinto

(57) ABSTRACT

In an image processing apparatus adapted to apply user-settable image processing to a sensed image, real time display in an electronic viewfinder of an image to which a user-set image processing is applied and an image to which such image processing is not applied is switched with each passage of a predetermined period of time or in response to a user operation. Implementing a preview function with the electronic viewfinder image enables the user to check the results of the image processing in real time prior to actual image sensing by comparing the processed image and the original image to provide an easy-to-use preview function.

5 Claims, 10 Drawing Sheets

IMAGE PROCESSING APPARATUS AND CONTROL METHOD THEREOF

FIELD OF THE INVENTION

The present invention relates to an image processing apparatus and a control method thereof, and more particularly, to an image processing apparatus and a control method thereof that enables image sensing with image processing set by a user applied.

BACKGROUND OF THE INVENTION

In recent years, with the spread of personal computers and digital cameras, image processing has come to be performed widely. Where image processing is applied to an original image using an image processing application software, which is also called a photo retouch software, it is necessary to determine the values of parameters such as filter application range and intensity and the extent of color tone adjustment.

Determining these sorts of parameter values is difficult for a beginner, and therefore applications that have the ability to set the best parameter values automatically are also available. However, with such automatic setting it is difficult to obtain the best value for each and every image, and normally most such applications determine the final parameter values through some sort of trial-and-error process.

In order to facilitate this sort of adjustment of parameter values based on trial and error, an application having a so-called preview function that enables a plurality of processed images to be displayed in such a way that the images can be compared is known.

By contrast, image processing apparatuses equipped with simple image processing capabilities are available as well. Specifically, functions are known that perform such effects when sensing images as intensifying colors so as to create more vivid color images, or, conversely, creating plain images, or again making the entire screen monochromatic or sepia-tinted.

In addition, it is desirable to have a configuration that enables the display not only of a preview screen but also of the original image after displaying the preview screen, in order to permit the effects of the image processing to be checked and to allow the image processing to be reset if necessary. Although such a configuration is of course necessary in such cases as, for example, conversion of the original images into a sepia-tinted image or a monochrome image, or where image processing is applied to the image screen as a whole such as in edge emphasis, it is even more necessary in the case of image processing that is applied to only a portion of an image.

For example, when applying such image processing as converting a specific color in the original image (for example, red) to another color (for example, yellow) the preview image changes the red area in the original image to yellow. In such a case, without being able to compare the preview image with the original image it is difficult for the user to check the effect of the image processing, and the user can find it difficult to change the source color (in this case red) or the destination color (yellow) because the original colors are lost.

SUMMARY OF THE INVENTION

The present invention is conceived in light of the problem with the conventional art described above, and can provide an easy-to-use preview capability in an image processing apparatus capable of adapting user-settable image processing to image sensing.

According to an aspect of the present invention, there is provided an image processing apparatus having an image-sensing unit and display unit, the apparatus adapted to use the display means as an electronic viewfinder by continuously displaying images obtained by the image-sensing unit on the display means, the apparatus comprising: an image processing unit adapted to apply image processing set arbitrarily to an image displayed on the electronic viewfinder; and a control unit adapted to display on the electronic viewfinder one after the other an image to which the image processing is applied by the image processing unit and an image to which the image processing is not applied by the image processing unit.

According to another aspect of the present invention, there is provided a control method for an image processing apparatus having an image-sensing unit and display unit, the apparatus adapted to use the display unit as an electronic viewfinder by continuously displaying images obtained by the image-sensing unit on the display unit, the method comprising: an image processing step of applying image processing set arbitrarily to an image displayed on the electronic viewfinder; and a control step of displaying on the electronic viewfinder one after the other an image to which the image processing is applied in the image processing step and an image to which the image processing is not applied in the image processing step.

With the above-described configuration, the image processing apparatus of the present invention enables a user to check the effect of an image processing set by the user by displaying a preview of the processed image prior to actual image sensing that applies the image processing set by the user. In addition, the image processing apparatus of the present invention enables the user to more clearly check the effects of image processing because the original image, which is not processed, is also displayed together with the above-described processed image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Preferred embodiments of the present invention will now be described in detail in accordance with the accompanying drawings.

The embodiments described below use the example of the present invention adapted to a digital still camera as one example of an image sensing apparatus 100. However, the present invention can be adapted not just to a digital still camera but to any image sensing apparatus that records images as electrical signals or as digital data, such as a digital video camera. Furthermore, the present invention can also be adapted to any apparatus capable of using such an image sensing apparatus or of having such an image sensing apparatus built in, such as an information processing apparatus equipped with an image sensing capability (for example a personal computer) or a portable terminal equipped with an image sensing capability (for example a mobile phone).

First Embodiment

A description is first given of the configuration of the image processing apparatus.

Figure 1:
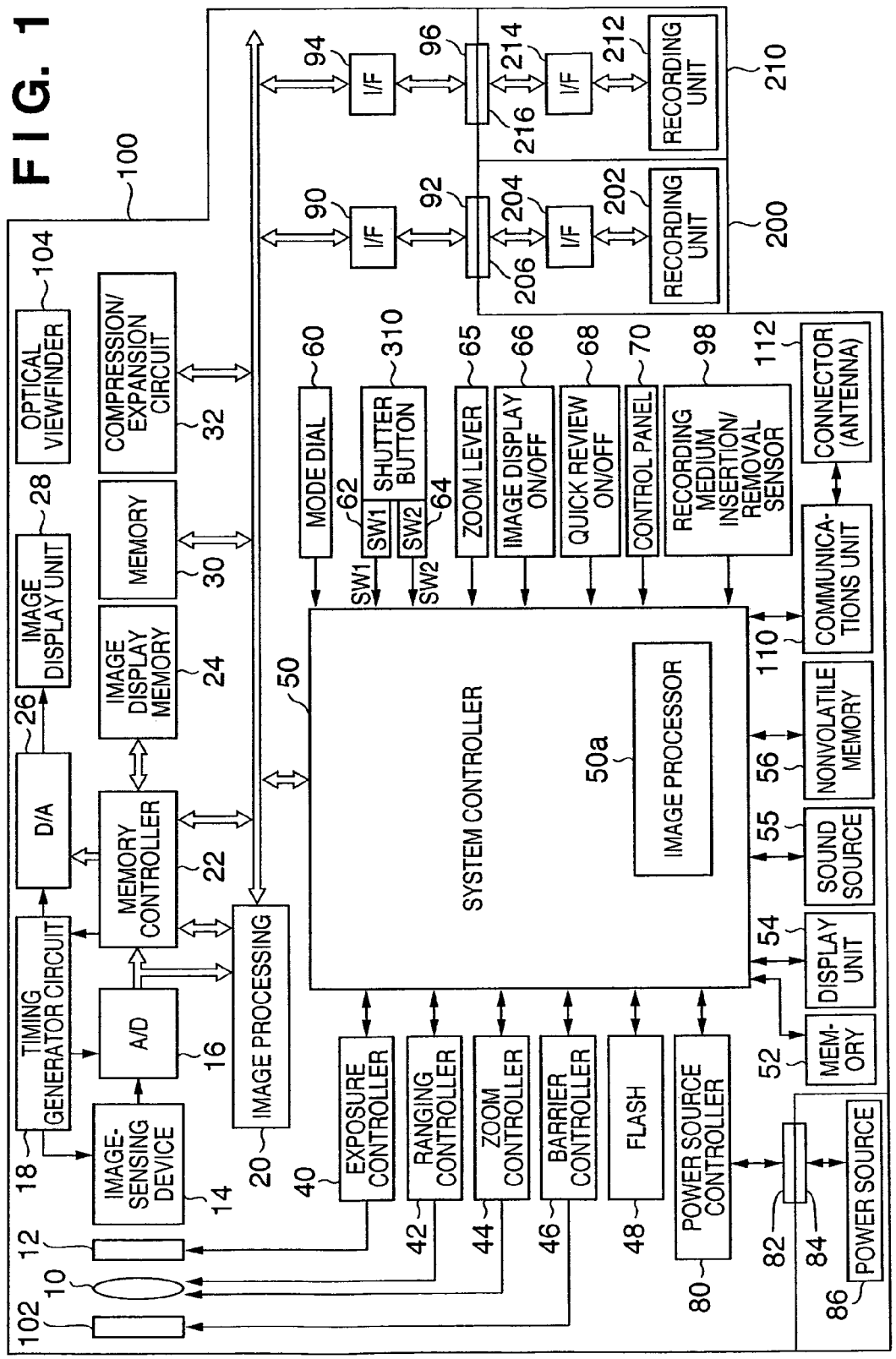
FIG. 1 is a block diagram showing an example of the configuration of a digital camera as an image processing apparatus according to one embodiment of the present invention.

FIG. 1 is a block diagram showing an example of the configuration of a digital still camera (hereinafter simply "digital camera") according to one embodiment of the present invention.

A digital camera 100 is configured so as to sense a subject through an optical system (an image sensing lens) 10. The optical system can be configured as a zoom lens, by which arrangement an optical zoom function is provided. Furthermore, the digital camera 100 can be configured so as to have an electronic zoom function, by which an image that is sensed by an image-sensing device 14 is enlarged by image processing. It should be noted that the digital camera 100 is sometimes configured so as to have one of either an optical zoom or an electronic zoom. Moreover, the optical system 10 may be interchangeable, as seen for example in single lens reflex digital cameras and the like.

The zoom function is accomplished by driving a lens used to change the magnification of the optical system 10, using a drive mechanism in the optical system 10 itself or a drive mechanism in the body of the digital camera 100.

Rays of light from the subject that pass through the optical system (the image sensing lens) 10 (that is, light rays that enter the angle of view of the lens) pass through an opening in a shutter equipped with an aperture function to form an optical image of the subject on an image-sensing surface of the image-sensing device 14 (which may be a CCD sensor, for example, or a CMOS sensor). The image-sensing device 14 converts this optical image into an analog image signal and outputs it to an A/D converter 16, which converts the analog image signal provided by the image-sensing device 14 into a digital image signal (digital data). The image-sensing device 14 and the A/D converter 16 are controlled by clock signals and control signals provide by a timing generator circuit 18. The timing generator circuit 18 is itself controlled by a memory control circuit 22 and a system control circuit 50.

An image processing circuit 20 performs certain types of image processing, such as pixel interpolation and color conversion, on image data provided from the A/D converter 16 or image data from the memory controller 22. In addition, based on the sensed image data, the image processing circuit 22 computes data for performing TTL (through the lens) auto focus (AF), auto exposure (AE), and pre-flash (EF), and provides the results of those computations to the system control circuit 50. The system control circuit 50 uses those computation results to control an exposure controller 40 and a ranging controller (AF controller) 42 to achieve the auto exposure and auto focus functions. Furthermore, the image processing circuit 20 also executes a TTL auto white balance (AWB) process based on the sensed image data.

The memory control circuit 22 controls the A/D converter 16, the timing generator circuit 18, the image processing circuit 20, an image display memory 24, a D/A converter 26, a memory 30 and a compression/expansion circuit 32.

Image data output from the A/D converter 16 is written to the image display memory 24 or to the memory 30 either through the image processing circuit 20 and the memory controller 22 or through the memory controller 22 alone. It should be noted that, when writing image data to the image display memory 24, that image data is thinned as appropriate depending on the resolution of the display of the image display unit 28. Image data for display that is written to the image display memory 24 is converted back into an analog signal for image display by the D/A converter 26 and displayed by the image display unit 28. The display of the image display unit 28 may be a thin-film transistor (TFT) liquid crystal display (LCD) or the like.

An electronic viewfinder (EVF) capability is achieved by continuously displaying the sensed images on the image display unit 28. The display on the image display unit 28 can be turned ON and OFF at will by commands from the system control circuit 50. Power consumption by the digital camera 100 can be greatly reduced by switching the display OFF.

The memory 30 is used to store sensed still images and moving images, and is provided with enough storage capacity to store a predetermined number of frames of still pictures or a predetermined length of time of moving images. As a result, large amounts of image data can be written to the memory 30 and at high speed, even in the case of automatic image sensing, involving multiple still images sensed continuously, and in panorama image sensing. In addition, the memory 30 can also be used as a work area for the system controller 50.

The compression/expansion circuit 32 compresses and expands image data using, for example, an Adaptive Discrete Cosine Transform (ADCT) or the like. The compression/expansion circuit 32 is configured to compress or expand the image data stored in the memory 30 and to write the processed image data to the memory 30.

The exposure controller 40, based on information provided by the system control circuit 50, controls the shutter 12 equipped with the aperture function. Moreover, the exposure controller 40 may also have a flash adjustment function linked to a flash 48. The flash 48 has the ability to project light for flash adjustment and AF auxiliary lighting.

The ranging controller 42, based on information provided by the system control circuit 50, controls the optical system 10 focusing lens. The zoom controller 44 controls zooming of the optical system 10. A barrier controller 46 controls the operation of a barrier 102 that protects the optical system 10.

The system control circuit 50 may be a CPU, for example, and controls the overall operation of the digital camera 100 by executing a program stored in the memory. The system control circuit 50 contains an image processor 50a that executes such processes as drawing an object that displays image sensing conditions and/or the operating status of the image sensing apparatus and the like that is displayed on the image display unit 28.

The memory 52 stores constants, variables, programs and the like for the operation of the system controller 50, as well as object data and the like for display of an object on the image display unit 28. Typically, the object data is recorded in the memory prior to shipment of the digital camera 100 from the factory. The object data may be rewritten by the user using data downloaded over an electronic communications line after shipment of the digital camera 100 from the factory or data stored on a recording medium and provided to the user. Alternatively, it may be rewritten at a service center or the like.

For example, a display unit 54, which may be an LCD or an LED, and/or, for example, a speaker sound source 55, are configured so as to output information concerning the operating status of the digital camera 100 as well as messages and the like using character, image or voice communications in response to the execution of a program in the system control circuit 50. The display unit 54, which may be a single unit or a plurality of units, is located where it can be seen easily from the vicinity of a control panel 70. Moreover, a portion of the display unit 54 may be located within the optical viewfinder 104.

The type of information that is displayed on the display unit 54 includes single shooting/continuous shooting, self-timer, compression rate, number of recorded pixels, number of exposures recorded, number of exposures remaining, shutter speed, aperture setting, exposure correction, flash, red-eye reduction, macroshooting, buzzer setting, remaining battery power for clock, remaining battery power, error, multi-digit information, insertion/removal status of recording media 200 and 210, communications IF operation, date/time, external computer connection status, focus, image sensing preparations complete, hand-shake warning, flash charged and recording medium write operation. Any or all of this information may be displayed inside the optical viewfinder 104.

A nonvolatile memory 56 is an electrically erasable/programmable memory such as an EEPROM. The object data described above may be stored in the nonvolatile memory 56.

A mode dial 60, shutter switches 62 and 64, an image display ON/OFF switch 66, a flash setting button 68 and a control panel 70 comprise operating unit for inputting a variety of operating instructions to the system control circuit 50. The operating means, for example, is comprised of combinations of single or multiple buttons, switches, dials, touch-screen panels, visual detection pointing devices, voice recognition devices and the like.

A concrete description will now be given of the operating unit.

The mode dial 60 switches among and sets such function modes as power off, automatic shooting mode, shooting mode, panorama capture mode, reproduction mode, multi-screen reproduction/erasure mode, PC connection mode, and so forth.

The first shutter switch (SW1) 62 designates is switched ON by pressing halfway a shutter button 310, and instructs the system control circuit 50 to start such operations as the AF (auto focus) process, the AE (auto exposure) process, the AWB (automatic white balance) process, the EF (pre-flash) process, and so forth.

The second shutter switch (SW2) 64 is switched ON by pressing completely the shutter button 310, which causes the system control circuit 50 to start a series of processes (sensing) including the following processes: After the image signal is read from the image-sensing device 14 and converted into image data by the A/D converter 16, the image data is processed by the image processing circuit 20 and written to the memory 30 via the memory control circuit 22. Then, the image data is read from the memory 30, compressed by the compression/expansion circuit 32 and the compressed image data is then written to the recording media 200 or 210.

A zoom controller 65 is used by a photographer to change the angle of view (zoom magnification or sensing magnification), and is comprised, for example, of a slide-type control member or a lever-type control member and a switch or a sensor that detects operation of the control member.

The image display ON/OFF switch 66 controls the display ON/OFF setting of the image display unit 28. When photographing using the optical viewfinder 104, power consumption can be reduced by turning the image display unit 28 display OFF, thereby cutting off the supply of electric current.

A flash setting button 68 is used to set/change the operating mode of the flash. In the present embodiment, the flash setting button 68 can be set to an auto mode, a flash mode, a red-eye reduction mode and a flash mode with red-eye reduction. The auto mode is a mode that adjusts the flash automatically according to the brightness of the subject. In the flash mode, the flash is always fired. The red-eye reduction mode automatically adjusts the flash according to the brightness of the subject and at the same time also fires a red-eye reduction light. In the flash mode with red-eye reduction, both the red-eye reduction light and the strobe are always fired.

The control panel 70 is composed of a variety of buttons and touch-screen panels. Specifically, the control panel 70 may include a menu button, a set button, a macro button, a multi-screen reproduction page change button, a single shooting/continuous shooting/self timer switching button, menu navigation+(plus) button, menu navigation−(minus) button. The control panel 70 may further include a reproduction image navigation+(plus) button, a reproduction image−(minus) button, a picture quality selection button, an exposure correction button, a date/time set button, and a compression mode switch and the like.

The compression mode switch is used to set and to select the compression rate of JPEG (Joint Photographic Expert Group) compression, recording in a RAW mode, and so forth. In the RAW mode, the analog image signal that the image-sensing device 14 outputs is recorded as is as digitized data (RAW data).

It should be noted that, in the present embodiment, the RAW data may include not only A/D-converted data that has been photoelectrically converted by the image-sensing device but also data that has been reversibly compressed after A/D conversion. Moreover, RAW data also means data of a state in which the information that is output from the image-sensing device is maintained without loss. For example, the A/D-converted analog image signal includes at least a stage in which the analog image signal has not yet been subjected to white balance processing, a stage at which the analog image signal has not yet been subjected to color separation processing that separates the analog image signal into a luminance signal and a color signal, and a stage at which the analog image signal has not yet been subjected to color interpolation processing. In addition, RAW data may include not only that which has been digitized but also the analog image signal itself as obtained from the image-sensing device.

In the present embodiment, the JPEG compression mode includes multiple modes, for example, a normal mode and a fine mode. The normal mode may be selected by the digital camera 100 user if the data size of the photographed image is of primary importance, and the fine mode may be selected by the digital camera 100 user if the picture quality of the photographed image is of primary importance.

In the JPEG compression mode, the compression/expansion circuit 32 reads from the memory 30 the image data that is written to the memory 30 and records it on, for example, recording medium 200, after compressing the image data at a set compression rate.

In the RAW mode, the analog image signal is read out as is line by line depending on the layout of the pixels of a color filter of the image-sensing device 14 image data written to the memory 30 via the A/D converter 16 and the memory control circuit 22 is recorded on the recording media 200 or 210.

It should be noted that the digital camera 100 of the present embodiment may have a simultaneous multi-exposure recording mode that permits multiple image data recording in response to a single operation performed by the user. For example, so-called auto bracket mode in which multiple image data are sensed with sensing conditions such as white balance and exposure have been changed in steps, is included in such a mode. Recording of images generated by applying different image processing to the same sensed image is also included in such mode. Such recording includes, for example, as described with respect to recording in the JPEG format and in the RAW format, a plurality of image data recordings of different data formats, image data recordings of the same format but different compression rates, and recordings of image data subjected to predetermined image processing as well as image data that is not subjected to predetermined image processing.

A power source controller 80 is comprised, for example, of a power source detection circuit, a DC-DC converter, a switching circuit for switching the blocks to be supplied with power. The power supply controller 80 also detects whether or not a power source has been installed, the type of power source, and the remaining battery power, controls the DC-DC converter based on the results of those detection operations and on instructions from the system control circuit 50, and supplies the necessary electrical voltage for the required time to the necessary blocks. A power source 86 may, for example, be a primary battery such as an alkaline battery or a lithium battery, a secondary battery such as a NiCd battery, a NiMH battery or a Li battery, an AC adapter or the like. The body of the digital camera 100 and the power source 86 are connected to each other by their respective connectors 82, 84.

The recording media 200 and 210 are comprised of recording parts 202 and 212 composed of semiconductor memories, magnetic disks or the like, as well as interfaces 204 and 214 and connectors 206 and 216 for connecting to the digital camera 100. The recording media 200 and 210 are loaded into the digital camera 100 through the media-side connectors 206 and 216 and the digital camera 100-side connectors 92 and 96. The interfaces 90 and 94 are then connected to the connectors 92, 96. Whether or not the recording media 200 and 210 are installed is detected by a recording medium insertion/removal sensor 98.

It should be noted that although in the present embodiment the digital camera 100 has two sets of interfaces and two sets of connectors for installing the recording media, there may be any number of sets of interfaces and connectors, including one each. Moreover, the sets of interfaces and connectors may have different specifications.

Anything that conforms to a PCMCIA card or CF (compact flash (registered trademark)) card specification, for example, can be used as the interfaces 90 and 94 and the connectors 92 and 96. In this case, by connecting various communications cards, image data and management information attached to the image data can be sent back and forth between the digital camera 100 and peripheral devices such as other computers, printers and the like. As the communications card there is, for example, a LAN card, a modem card, a USB card, an IEEE 1394 card, a P1284 card, a SCSI card, a PHS communications card and the like.

The optical viewfinder 104 may be a TTL viewfinder, for example, and focuses beams of light passing through the lens 10 using prisms, mirrors and so forth. Using the optical viewfinder 104 enables a shooting operation without using the electronic viewfinder function provided by the image display unit 28. Display elements that form a portion of the image display unit 28 may be positioned within the optical viewfinder 104, for example, display elements for displaying the focus, the hand-shake warning, the flash charged, the shutter speed, the aperture value, and the exposure correction display and the like.

A communications circuit 110 implements a variety of communications functions such as USB, IEEE 1394, P 1284, SCSI, modem, LAN, RS 232C, wireless communications and the like. A connector 112 for connecting the digital camera 100 to other devices may be connected to the communications circuit 110, as may an antenna when providing wireless communications.

Figure 2:
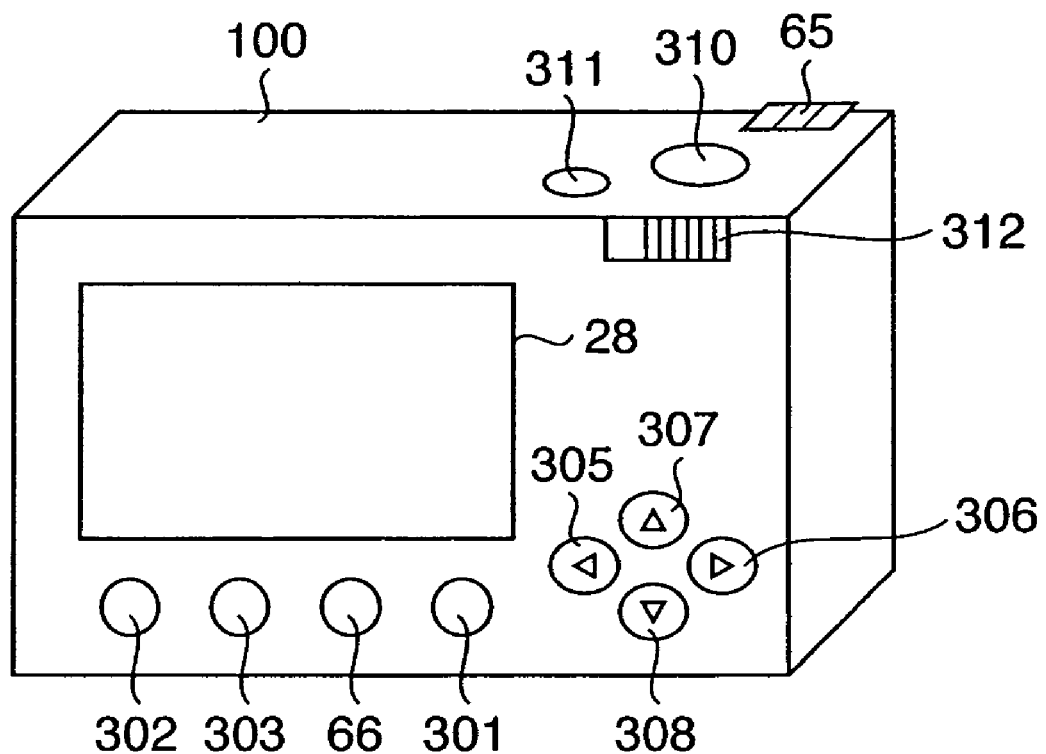
FIG. 2 is a perspective view showing one external configuration of an image processing apparatus according to one embodiment of the present invention.

FIG. 2 is a perspective view showing one external configuration of the digital camera 100. It should be noted that, in FIG. 2, parts not necessary to the description are omitted. The control panel 70 described above includes the buttons and switches 301-311 shown for example in FIG. 2. The user manipulates these buttons and switches 301-311 when switching the digital camera 100 power source ON/OFF, setting or changing sensing conditions, checking sensing conditions, checking the operating status of the apparatus, checking the sensed image and so forth.

A power button 311 activates and deactivates the digital camera 100, or switches the digital camera 100 main power source ON/OFF. A menu button 302 displays a setting menu for the sensing conditions, operating mode and the like of the digital camera 100, and displays a menu for displaying the operating status of the digital camera 100. The menus may have a layered structure, for example, with each layer containing selectable items and/or items whose values can be changed.

An erase button 301, when pressed, erases images displayed in an image list mode or on a sensed image confirmation screen. In the present embodiment, the sensed image confirmation screen displays the sensed image on the image display unit 28 immediately after sensing to permit the user to check the results (a so-called quick preview screen). In the present embodiment, the sensed image confirmation screen is displayed when the user presses the shutter button 310 to instruct sense and then holds the shutter button 310 down after sensing, for as long as the shutter button 310 is pressed and held down.

A setting button 303, when pressed, sets or selects a mode or an item. When the setting button 303 is pressed, the system control circuit 50 sets the mode or the item selected at the time. The image display ON/OFF switch 66 is used to select display/non-display of sensing information for a sensed image and to switch between having the image display unit 28 function as an electronic viewfinder or not.

A left button 305, a right button 306, an up button 307 and a down button 308 may be used for such purposes as changing a choice (for example, an item or an image) selected from among a plurality of choices by a cursor or by highlighting or the like, changing the positions of indices that define selected menu choices, and increasing or decreasing numerical values (for example, numerical values indicating correction values, date/time, or the like).

It should be noted that, in the present embodiment, a color conversion effect that changes the color of a particular area contained within a sensed image is used as an example of an image process (that is, an effect) that can be applied to a sensed image. Designation of the target color to be changed (the source color) and the color that is to result (the destination color) is carried out using an image displayed in the electronic viewfinder.

Specifically, in a color conversion effect setting screen (a color designation screen), pressing the left button 305 sets an average color of an image contained in a small area in the center of the electronic viewfinder as the source color and pressing the right button 306 similarly sets the destination color. Of course, any other method may be used to designate the source color and the destination color, such as, for example, using dedicated buttons without enlisting directional buttons, designating the source color and the destination color one after the other using the same button, and so forth.

When pressed halfway, for example, the shutter button 310 instructs the system control circuit 50 to start the AF (auto focus) process, the AE (auto focus) process, the AWB (auto white balance) process, the EF (pre-flash) process and the like. When pressed completely, the system control circuit 50 is instructed to sense an image.

The zoom controller 65, as described above, is operated by a photographer to change the angle of view (zoom magnification or sensing magnification).

A record/reproduce switching switch 312 is used to switch the recording mode to the reproduction mode as well as to switch the reproduction mode to the recording mode. It should be noted that, in place of the foregoing control system, a dial switch or some other control system may be used instead.

A description will now be given of the operation of the image processing apparatus of the present invention.

Figure 3:
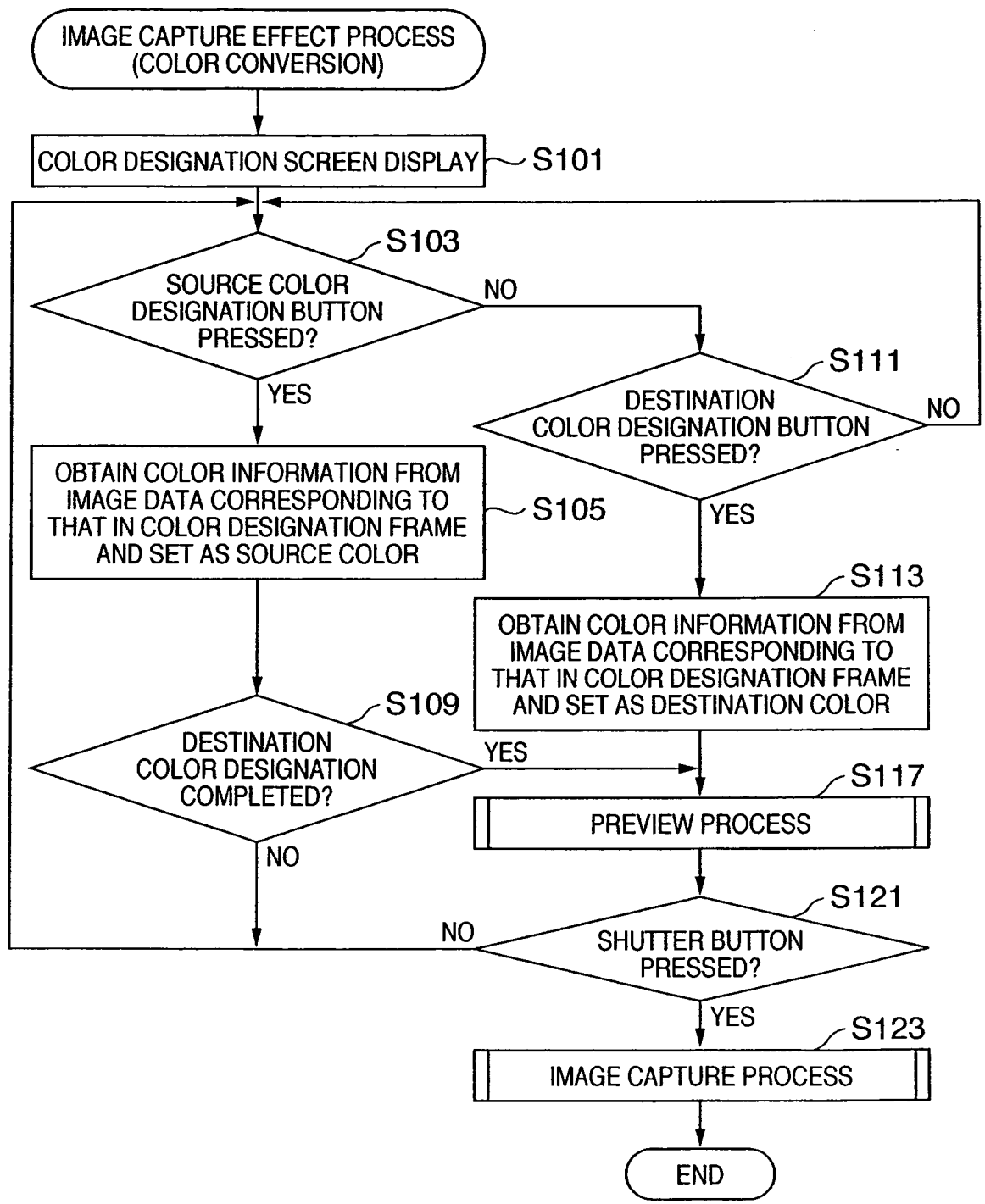
FIG. 3 is a flow chart illustrating a sensing operation of the digital camera 100 according to the present embodiment in case that an effect is to be applied to a sensed image.

FIG. 3 is a flow chart illustrating a sensing operation of the digital camera 100 according to the present embodiment in case that an effect is to be applied to a sensed image. In the present embodiment, as an image process that can be applied during image sensing operation (a sensing effect), a description is given of a case in which a color conversion process that converts a target color contained in a sensed image into a destination color is selected. Moreover, execution of a shooting mode applying a color conversion process is set by the user in advance through the setting menu.

First, in step S101, the memory control circuit 22 causes the image display unit 28 to function as an electronic viewfinder by continuously writing image data output by the A/D converter 16 to the image display memory 24. Moreover, the image processor 50a inside the system control circuit 50 writes graphical user interface (GUI) data for enabling the user to designate the source color and the destination color that are necessary to the color conversion process to the image display memory 24. These processes allow the color designation screen to be displayed on the image display unit 28. Thus, the color designation screen consists of an ordinary electronic viewfinder to which a special GUI is added. It should be noted that, in the present embodiment, the images that are displayed in real time so as to achieve the electronic viewfinder are also called through images.

Figure 4:
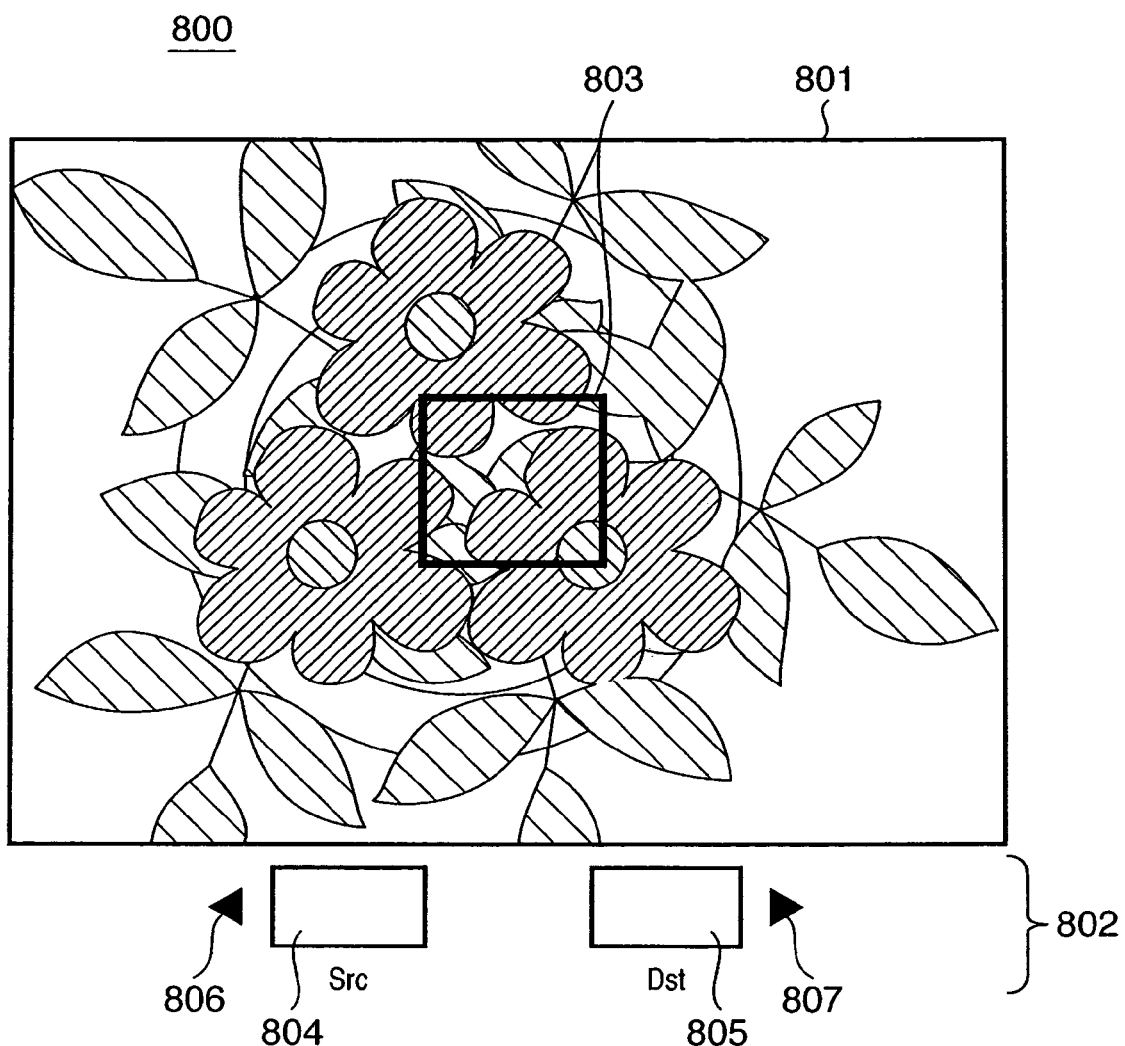
FIG. 4 is a diagram showing one example of a display on a color designation screen of the digital camera 100 according to one embodiment of the present invention.

FIG. 4 is a diagram showing an example of the color designation screen. A color designation screen 800 is broadly divided into an electronic viewfinder (EVF) area (hereinafter called simply "EVF") 801 and a GUI area 802. A fixed color designation frame 803 is displayed in the center of the electronic viewfinder area 801. A change source color display frame 804 and a change destination color display frame 805, respectively, are provided in the GUI area 802. Moreover, indicators 806 and 807 are provided so that the user can easily grasp visually that the change source color (Src) designation function is allocated to the left button and the change destination color (Dst) designation function is allocated to the right button, respectively.

Here, the user is attempting to change the colors of a potted plant currently displayed in the EVF 801 using the color conversion process. In this case, in order to designate the change source color, the user first either approaches the potted plant or uses the optical zoom function to place the petals of the plant substantially in the center of the color designation frame 803 and then presses the left button 305 as the source color designation button.

Figure 5:
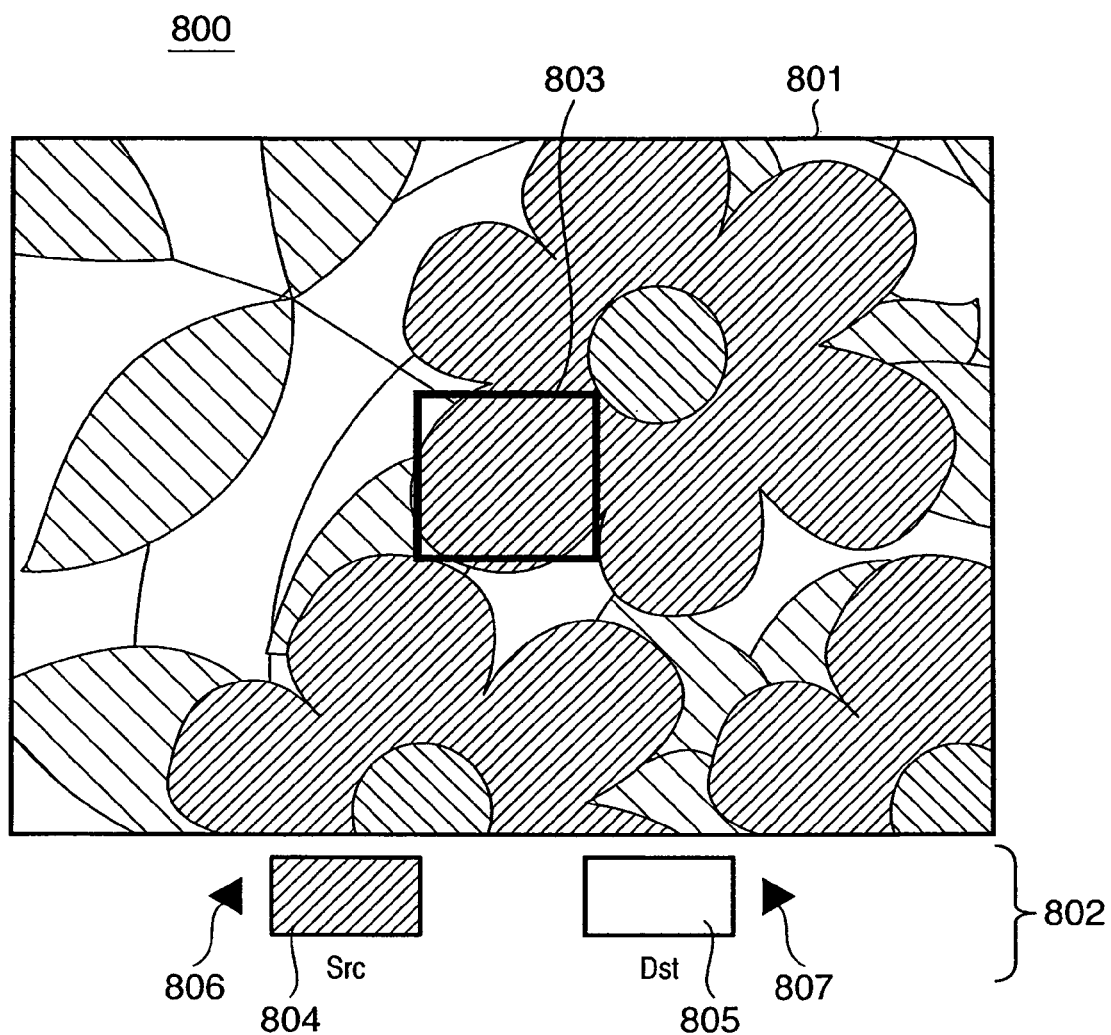
FIG. 5 is a diagram showing another example of a display on the color designation screen of the digital camera 100 according to one embodiment of the present invention.

The system control circuit 50 detects when the source color designation button in the color designation screen is pressed (step S103), reads the image data corresponding to the coordinates within the color designation frame 803 image display memory 24, and obtains the source color. Although there is no particular limitation on the method used to obtain the source color from the image data within the color designation frame 803, it is possible to use a color that corresponds to the average value of the image data within the color designation frame 803. The system control circuit 50 sets the source color thus obtained by saving it to the memory 30 and also displays it in the source color display frame 804 of the GUI area 802 through the image processor 50a (step S105). This condition is shown in FIG. 5.

In step S109, the system control circuit 50 checks if the destination color has been set. Here, the destination color has not yet been set, and thus processing returns to step S103. At this time, on the through image, the area of the color that corresponds to the source color may be shaded with diagonal stripes or overlaid by a grid for easy identification. In the present embodiment, as with the designation of the source color, the designation of the destination color is carried out using the through image.

Figure 6:
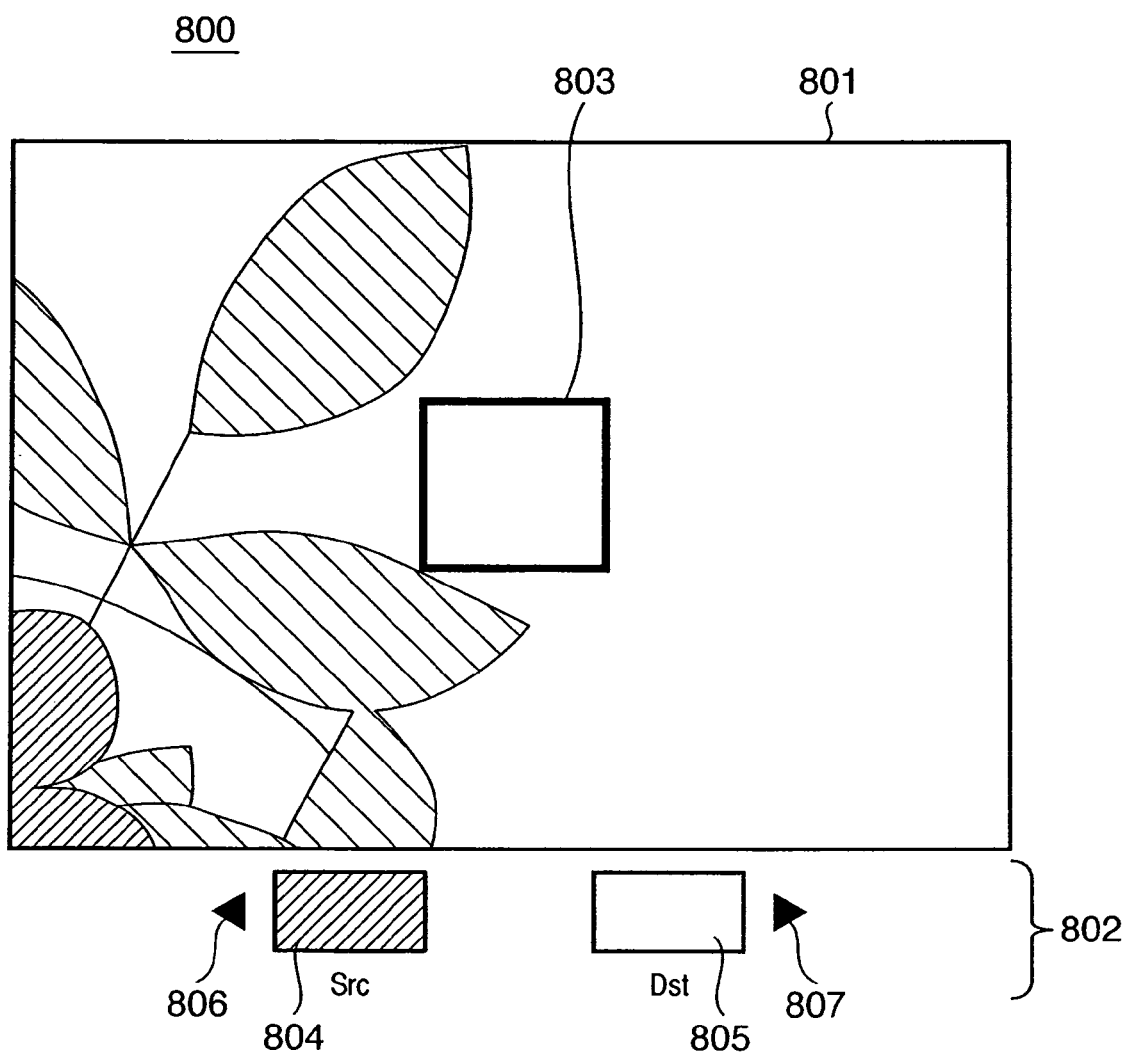
FIG. 6 is a diagram showing another example of a display on the color designation screen of the digital camera 100 according to one embodiment of the present invention.

FIG. 6 shows a state in which the user is attempting to designate the destination color from a background area on the color designation screen. In step S111 the system control circuit 50 detects when the user presses the right button 806, which is the destination color designation button, in such a state.

Then, the system control circuit 50 obtains the destination color using the same method as that used to obtain the source color and sets the destination color by storing it in the memory 30. At the same time, the system control circuit 50 displays the destination color in the destination color display frame 805 of the GUI area 802 through the image processor 50a (step S113).

Next, in step S117 the system control circuit 50 performs a preview process.

If the shutter button is pressed during preview (step S121) the image processing circuit 20 performs a shooting process to which the color conversion process is applied (step S123), and records the sensed image on the recording media 200 or 210.

By contrast, if the source color designation button or the destination color designation button is pressed once again during preview, the source color or the destination color is reset based on the image data inside the color designation frame of the through image at that time.

Figure 7:
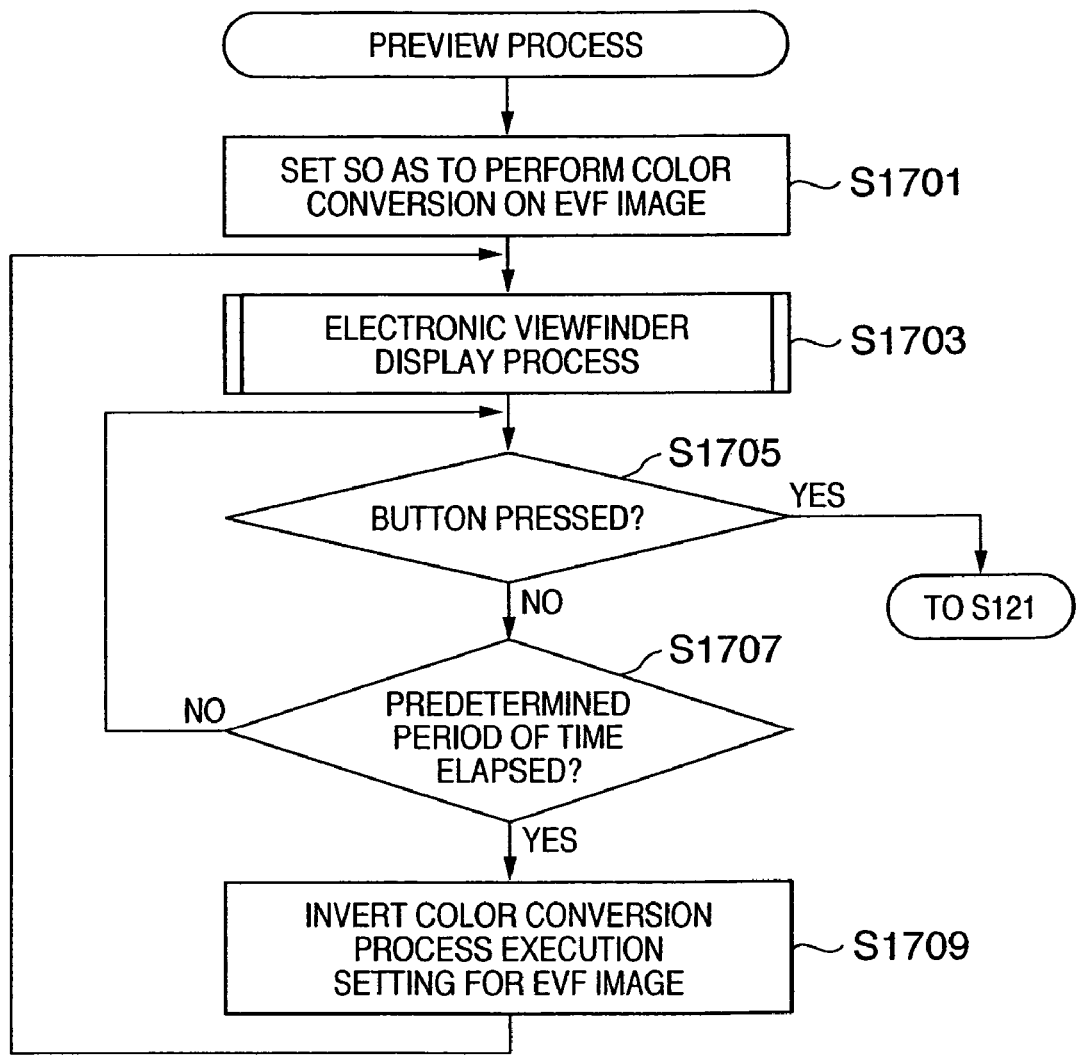
FIG. 7 is a flow chart illustrating a preview process in the digital camera 100 according to a first embodiment of the present invention.

Next, a detailed description is given of the preview process in step S117, using the flow chart shown in FIG. 7.

Figure 8:
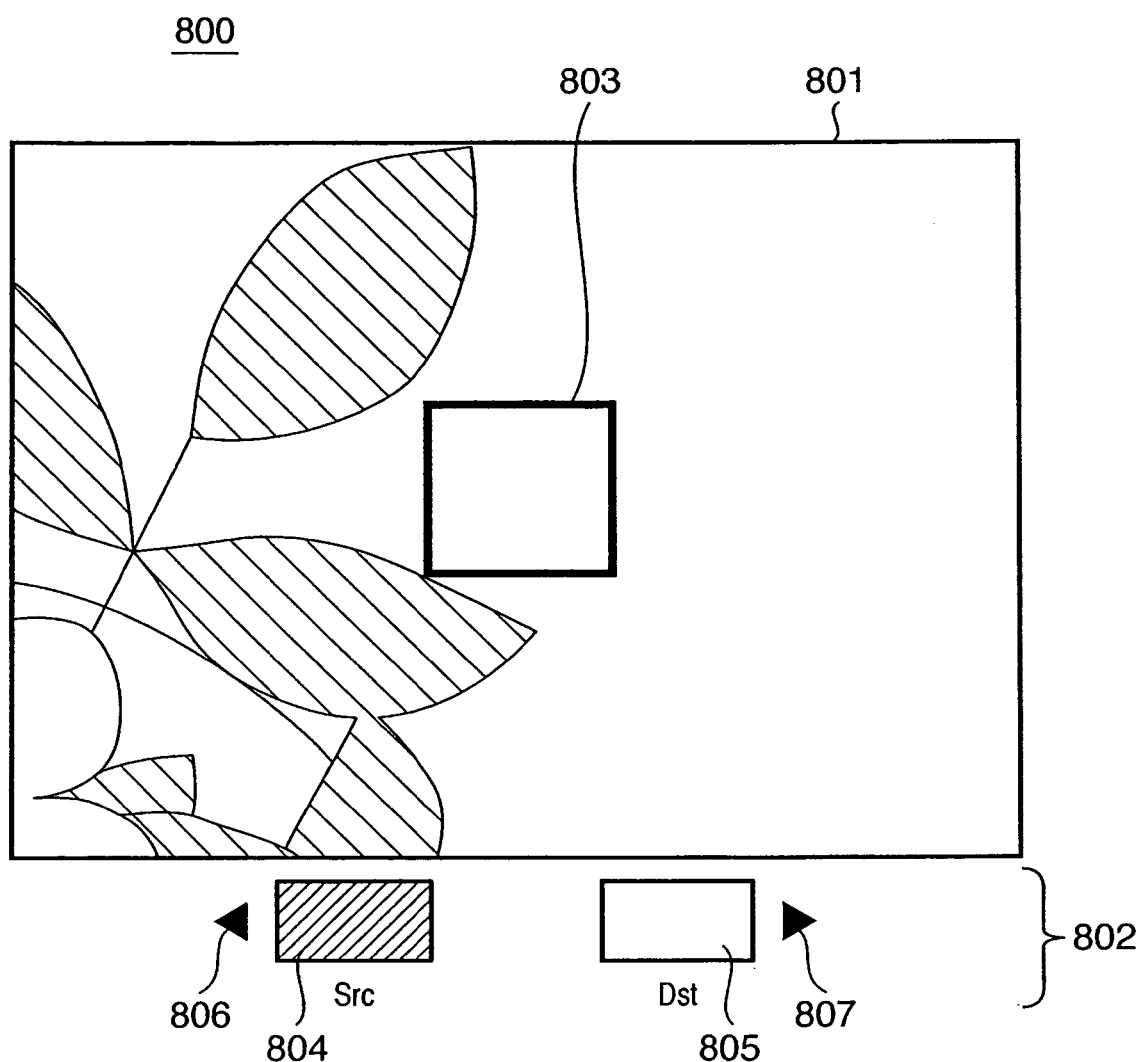
FIG. 8 is a diagram showing one example of a preview image in the digital camera 100 according to the first embodiment of the present invention.

First, in a step S1701, the system control circuit 50 instructs the image processing circuit 20 to apply a color conversion process to the through image. Then, in step S1703, the system control circuit 50 performs an electronic viewfinder display process. Implementation of the color conversion process is set in step S1701, and therefore the image processing circuit 20 performs a color conversion process on the image data output by the A/D converter 16 using the source color and the destination color stored in the memory 30 and supplies the color conversion processed image data to the memory controller 22. The memory controller 22 then writes the color conversion processed image data to the image display memory 24. Thus the color designation screen changes from the state of the through image before color conversion processing shown in FIG. 6 to the state shown in FIG. 8, in which the color of the flower petals has been changed.

It should be noted that although it is possible to implement this type of color conversion process using well known image processing technology, it is preferable to use a color conversion process that uses a three-dimensional look-up table (LUT) like that disclosed in Japanese Laid-Open Patent Publication No. 2004-80100, for example, because doing so maintains tonality.

Next, the system control circuit 50 checks if the shutter button has been pressed or not (step S1705). If the shutter button has been pressed, then processing proceeds to step S121 (FIG. 3). If the shutter button has not been pressed, then in step S1707 the passage of a predetermined period of time (for example, 1 second) is awaited. When the predetermined period of time elapses, in step S1709 the system control circuit 50 inverts the setting of image processing circuit 20 for the application of the color conversion process to the through image. In other words, at this point the image processing circuit 20 is set both to not apply the color conversion process, as well as to apply the color conversion process when the predetermined period of time next elapses.

Thus, as described above, a state of flashing display of the through image prior to color conversion and the preview image after conversion is achieved. The order of flashing is set so that the through image prior to color conversion is displayed first. This arrangement enables the user to comprehend which color of the image has actually been changed by comparing it to the original image.

In addition, in such a state, if the user is satisfied with the post-color conversion preview image, the user can carry out image sensing as is by pressing the shutter button (step S121→step S123). If the user is not satisfied with the post-color conversion preview image, the user can redo the color designation (step S121→step S103). It should be noted that the process of redoing the color designation by pressing the color designation buttons once again changes the order of flashing so that the preview image is displayed first and then the through image with no color converse is displayed, thereby enabling the color conversion to be redone upon checking which area of color is currently changing.

Thus, as described above, by instructing the application of the color conversion process to the through image to be executed and then cancelled one after the other with each passage of a predetermined period of time, a non-color-converted image (FIG. 6) and a color-converted image (FIG. 8) are displayed one after the other on the image display unit 28. It should be noted that a variety of methods may be used to enable the user to distinguish clearly between the color-converted image and the non-color-converted image, such as using fade-out and fade-in, not displaying an image for a brief period of time when switching between the two types of images, displaying flashing images, and so forth.

In addition, in order to indicate which flashing image is the original image and which is the processed image, an identifying display may be added to at least one of the original image and the processed image. For example, the letter "S", for "Source", may be superimposed on the original image, in order to identify it as such.

Figure 9:
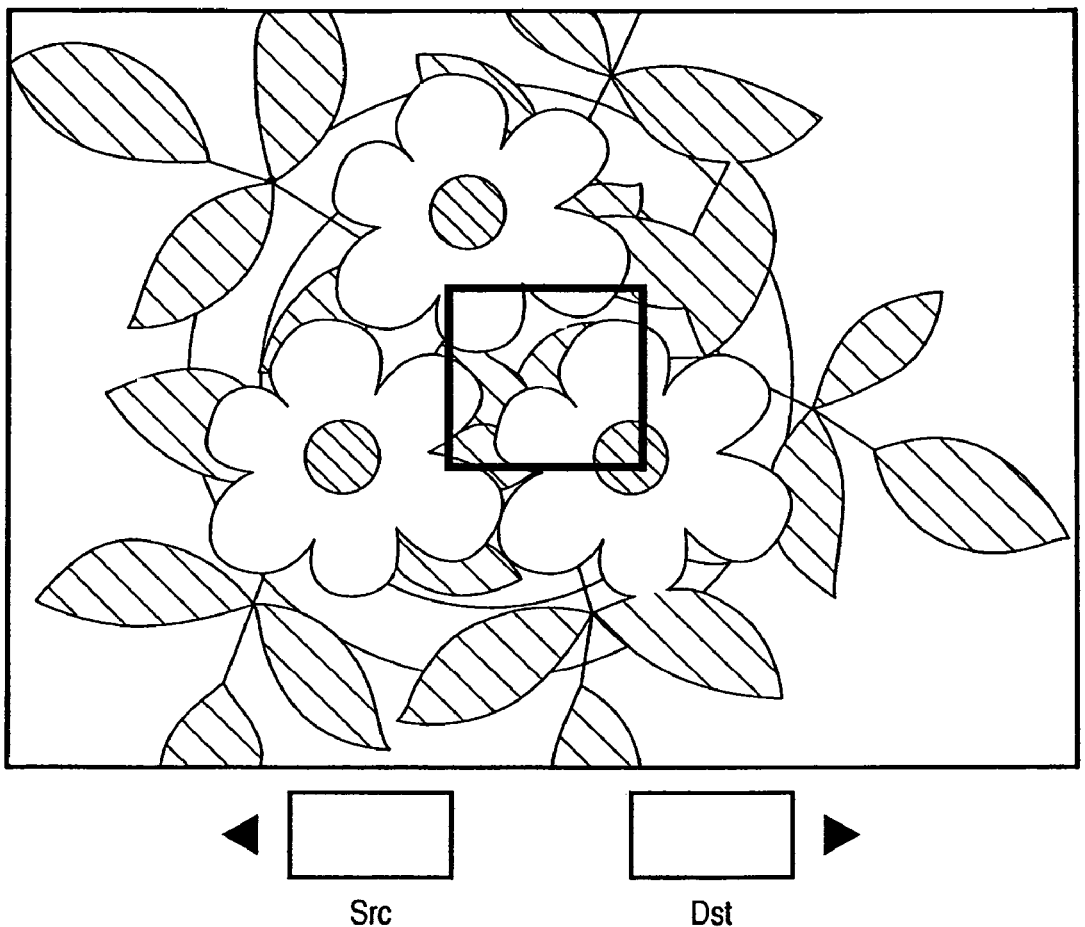
FIG. 9 is a diagram showing another example of a preview image in the digital camera 100 according to the first embodiment of the present invention.

The preview process is carried out using an electronic viewfinder display process, and thus the display of the EVF 801 of the color designation screen 800 tracks user operation even when the user performs a zooming operation or moves the camera. Therefore, in the state shown in FIG. 8, when zooming to the wide-angle side or when the user moves the camera away from the subject, the state shown in FIG. 4 and the state show in FIG. 9 are displayed one after the other.

Thus, by providing a preview display of the effect that is set when performing image sensing while applying an image processing effect to the sensed image, the present embodiment enables the user to confirm what kind of effect the set effect has on the sensed image before actual image sensing is performed. Moreover, the preview display is performed with the electronic viewfinder display image, enabling the user to confirm the effect of image processing in real time prior to image sensing.

In addition, because the preview display displays the original image on which image processing has not been performed and the image to which image processing has been applied in such a way that the two images can be compared, the present embodiment enables the user to grasp the effect of image processing more accurately and more easily.

Second Embodiment

In the first embodiment of the present invention, the preview display is accomplished by ordering of the execution of the application of image processing and ordering the cancellation of that execution one after the other so as to switch automatically between an original image that has not been processed and a processed image that has been processed with each passage of a predetermined period of time. By contrast, a second embodiment of the present invention switches the display by ordering the execution of the application of image processing and the cancellation of that execution one after the other in response to a user instruction. It should be noted that, other than the preview process, the operation and the structure of a digital camera 100 according to this second embodiment are identical to those of the first embodiment, and therefore a description is given only of the preview process in the second embodiment.

Figure 10:
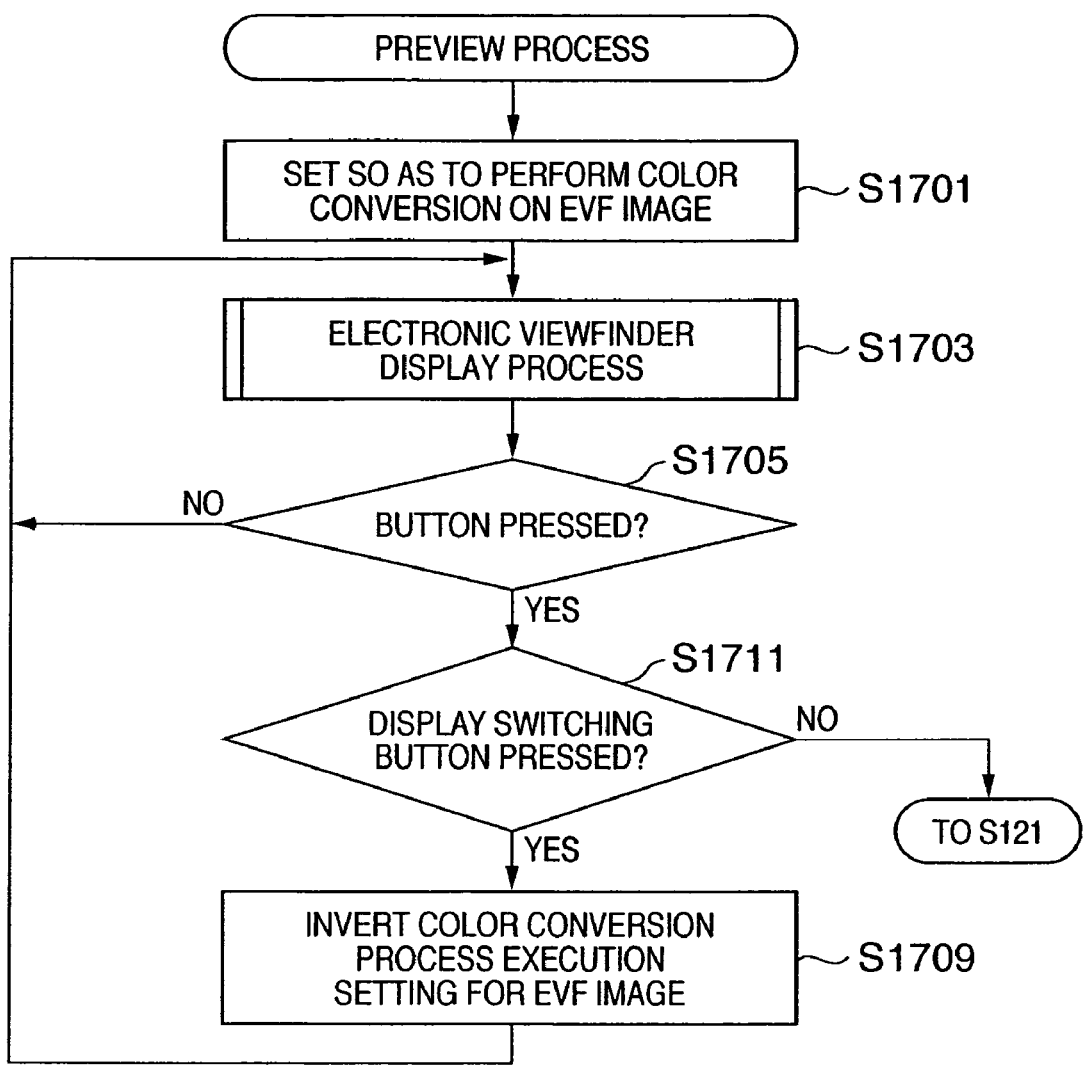
FIG. 10 is a flow chart illustrating the preview process in the digital camera 100 according to a second embodiment of the present invention.

FIG. 10 is a flow chart illustrating the preview process in the digital camera 100 that is the image processing apparatus according to the second embodiment of the present invention. In FIG. 10, processes that are the same as the preview process in the first embodiment are given the same reference numerals.

The processes of steps S1701 and S1703 are the same as the first embodiment. In step S1705, the system control circuit 50 checks whether or not the shutter button has been pressed, and if so processing proceeds to step S1711. In step S1711, the system control circuit 50 confirms whether or not a display switching button (for example, the display ON/OFF button 66) has been pressed. Processing proceeds to step S121 (in FIG. 3) if a button other than the display switching button has been pressed.

If the display switching button has been pressed, then in step S1709 the system control circuit 50 inverts the setting of the image processing circuit 20 for the application of the color conversion process to the through image. In other words, at this point the image processing circuit 20 is set both to not apply the color conversion process, as well as to apply the color conversion process when the predetermined period of time next elapses.

Thus, as described above, in the present embodiment, by ordering the execution of application of the color conversion process to the through image and then the cancellation of the execution of the application of the color conversion process to the through image each time the display switching button is pressed, the non-color-converted image and the color-converted image are displayed one after the other on the image display unit 28.

In the second embodiment, as with the first embodiment, an identifying display may be added to at least one of the original image and the image after image processing is applied.

Thus, as described above, by providing a preview display of the effect that is set when performing image sensing while applying an image processing effect to the sensed image, the present embodiment enables the user to confirm what kind of effect the set effect has on the sensed image.

In addition, because the preview display switches the display of the original image on which image processing has not been performed and the image to which image processing has been applied by user instruction, the present embodiment enables the user to grasp the effect of image processing more accurately and more easily. Moreover, unlike the first embodiment, the second embodiment enables the user to compare the original image and the processed image at a time desired by the user.

Other Embodiments

Although in the foregoing embodiments a color conversion process that converts one particular color into a different color is described as an example of the type of image processing that can be designated during image sensing, other types of image processing are also possible. Moreover, it is not necessary that the conversion of color involve a single pair of colors, and thus multiple sets of source colors and destination colors may be designated.

In addition, the units that comprise the image processing apparatus in the foregoing embodiments of the present invention as well as the steps that implement the image processing method, may be implemented as software by causing a computer (or CPU) contained in the image processing apparatus to execute a control program. Such a control program, as well as a computer-readable storage medium storing the control program, are also included in the present invention.

In addition, in the foregoing embodiments a structure is described that switches between through images to which image processing is applied and through images to which image processing is not applied by switching the application of image processing by the image processing circuit 20 on and off. However, the present invention is not limited to such an arrangement, and any method may be used provided that it enables the display to switch between a processed image and an unprocessed original image.

For example, the image processing circuit 20 itself constantly executes an operation that applies image processing. If the memory controller 22 is then configured so as to select an image to be written to the image display memory 24 from a through image that does not pass through the image processing circuit 20 and an image to which image processing has been applied by the image processing circuit 20, then the same result can be achieved.

In such a case, in step S1701 shown in FIG. 7 and FIG. 10, the image that is to be written to the image display memory 24 is set to the image that the image processing circuit 20 outputs. Then, in step S1709, the image to be written to the image display memory 24 is set to a through-image that does not pass through the image processing circuit 20.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-018523 filed on Jan. 26, 2005, which is hereby incorporated by reference herein its entirety.

What is claimed is:

1. An image processing apparatus capable of applying an image processing set by a user to an image obtained by an image sensing unit, the apparatus comprising:

a display unit adapted to continuously display images obtained from the image sensing unit in real time;

an image processing unit adapted to apply the image processing to an image obtained by the image sensing unit in real time on the basis of a value set by a user operation; and a control unit adapted to control said display unit to alternately display a processed image, obtained from the image sensing unit in real time, to which the image processing is applied in real time by said image processing unit and a non-processed image, obtained from the image sensing unit in real time, to which the image processing is not applied by said image processing unit, so as to enable the user to compare the processed image with the non-processed image.

2. The image processing apparatus according to claim 1, wherein a value necessary to the image processing is set by a user operation using an area of an image displayed in real time on said display unit.

3. The image processing apparatus according to claim 1, wherein said control unit further controls said display unit to alternately display, with each passage of a predetermined period of time, the processed image, obtained from the image sensing unit, to which the image processing is applied in real time by said image processing unit and the non-processed image, obtained from said image sensing unit, to which the image processing is not applied by said image processing unit.

4. The image processing apparatus according to claim 1, wherein said control unit further controls said display unit to alternately display, in response to a user operation, the processed image, obtained from the image sensing unit, to which the image processing is applied in real time by said image processing unit and the non-processed image, obtained from the image sensing unit, to which the image processing is not applied by said image processing unit.

5. An image processing method capable of applying an image processing set by a user to an image obtained by an image sensing unit, the method comprising:

a display step of continuously displaying images obtained from the image sensing unit in real time;

an image processing step of applying the image processing to an image obtained by the image sensing unit in real time on the basis of a value set by a user operation; and a control step adapted to control said display step to alternately display a processed image, obtained from the image sensing unit in real time, to which the image processing is applied in real time in said image processing step and a non-processed image, obtained from the image sensing unit in real time, to which the image processing is not applied in said image processing step, so as to enable the user to compare the processed image with the non-processed image.

* * * * *